United States Patent
Nishino

[11] Patent Number: 5,754,895
[45] Date of Patent: May 19, 1998

[54] PHOTOGRAPHIC CAMERA USING FREQUENCY DIVIDED PULSES FOR RAPID ADJUSTMENT OF MOVABLE FEATURES

[75] Inventor: Naoyuki Nishino, Asaka, Japan

[73] Assignee: Fuji Photo Film Co., Ltd., Kanagawa, Japan

[21] Appl. No.: 868,998

[22] Filed: Jun. 4, 1997

Related U.S. Application Data

[63] Continuation of Ser. No. 421,907, Apr. 14, 1995, abandoned.

[30] Foreign Application Priority Data

Apr. 15, 1994 [JP] Japan .................................. 6-077333

[51] Int. Cl.$^6$ .................................................. G03B 3/10
[52] U.S. Cl. ........................ 396/79; 396/86; 396/135
[58] Field of Search .............................. 396/72, 79, 85, 396/86, 87, 89, 133, 135, 136; 348/345, 347; 359/694, 696

[56] References Cited

FOREIGN PATENT DOCUMENTS

61-166508  7/1986  Japan.

Primary Examiner—Safet Metjahic
Assistant Examiner—J. K. Han
Attorney, Agent, or Firm—Sughrue, Mion, Zinn, Macpeak & Seas, PLLC

[57] ABSTRACT

A photographic camera has a movable part to be driven by an electric motor. A rotary encoder generates a pulse for every predetermined angle rotation of the motor and the motor is feedback-controlled on the basis of a pulse signal consisting of a plurality of the pulses output from the rotary encoder. The pulse signal is divided by pulse number into a high-speed portion signal corresponding to a period where the motor is to be driven at a high speed and a low-speed portion signal corresponding to a period where the motor is to be driven at a low speed. The high-speed portion signal is frequency-divided, and the motor is driven at a high speed by the frequency-divided high-speed portion signal.

3 Claims, 8 Drawing Sheets

PHOTOGRAPHIC CAMERA USING FREQUENCY DIVIDED PULSES FOR RAPID ADJUSTMENT OF MOVABLE FEATURES

This is a Continuation of Ser. No. 08/421,907, filed Apr. 14, 1995, now abandoned.

BACKGROUND OF THE INVENTION

1. Field of the Invention

This invention relates to a photographic camera, and more particularly to control of a photographic camera having an optical system and/or a film feeding system driven by an electric motor.

2. Description of the Prior Art

Conventionally, movable parts in a photographic camera such as optical parts, which are moved in focusing or zooming, are driven by a step motor. This is because the travel distance of the movable parts can be easily controlled by use of a step motor.

Recently the possible travel distance of the movable parts of a zoom lens system has been elongated with an increase in the zoom ratio of the zoom lens system, and the number of steps for controlling the step motor has been increased. Furthermore, the weight of the optical system of the camera has been increased with increase in the zoom ratio, and it has become difficult to drive the optical system at a high speed by the step motor which has a relatively small driving torque.

On the other hand, a higher accuracy in controlling the step motor is required in focusing in order to obtain more precise focusing.

Thus, a DC motor which can drive the movable parts a long distance at a high speed has come to be used. However the DC motor requires a feedback control system for control of its position, and a signal generating means such as a rotary encoder which generates a pulse signal having a pulse number corresponding to the rotational speed of the motor is used. In order to realize more accurate control, the resolution of the slit for generating the pulse signal should be very high.

However, when the resolution of the signal generating means is high, the pulse intervals of input pulses become short and the number of the input pulses (steps) is increased when the parts are driven a long distance at a high speed, whereby the load on the feedback control system becomes very heavy, which gives rise to a problem that one or more of the pulses generated by the signal generating means can be missed.

SUMMARY OF THE INVENTION

In view of the foregoing observations and description, the primary object of the present invention is to provide a photographic camera in which the motor for driving movable parts of the camera can be accurately driven at a high speed even if the movable parts are to be moved a long distance.

In the camera according to the present invention, the total travel distance of a movable part is divided into a high-speed section, where the part is to be moved at a high speed, and a low-speed section, where the part is to be moved at a low speed. In the high-speed section, a pulse signal generated by a signal generating means, such as an encoder for feedback-controlling the motor, is frequency-divided and the motor is feedback-controlled by the frequency-divided pulse signal, thereby driving the motor at a high speed. When the total travel distance can be known in advance, i.e., prior to the start of driving the motor, the total travel distance can be divided in a predetermined division ratio prior to driving the motor and the motor is driven according to the division ratio. On the other hand, when the total travel distance is not known in advance, i.e., when the total travel distance is determined during driving of the motor, the motor is driven at a high speed by continuous input of a signal commanding high speed travel of the movable part from the start of the high-speed section to the end of the same or by inputting signals respectively designating the start and end of the high-speed section.

That is, the camera of the present invention is characterized in that the pulse signal for feedback control of the motor is divided by pulse number into a high-speed portion signal corresponding to a period where the motor is to be driven at a high speed and a low-speed portion signal corresponding to a period where the motor is to be driven at a low speed. The high-speed portion signal is frequency-divided and the motor is driven at a high speed under feedback control based on the frequency-divided high-speed portion signal.

When the total travel distance of the movable part is known in advance, the camera of the present invention may comprise an electric motor which drives a movable part of the camera, a pulse generating means which generates a pulse for every predetermined angle rotation of the motor, a pulse detecting means which detects the pulses generated by the pulse generating means, a target travel distance calculating means which calculates a target travel distance through which the movable part is to be moved, a target pulse number calculating means which calculates a target number of the pulses which the pulse detecting means should detect when the motor rotates to move the movable part through the target travel distance and a motor control means which feedback-controls the motor on the basis of the target number of pulses and a pulse signal consisting of a plurality of the pulses output from the pulse detecting means, wherein the motor control means is provided with a frequency division means which frequency-divides the pulse signal output from the pulse detecting means and input into the control means, and a frequency division control means which divides the target number of pulses calculated by the target pulse number calculating means into a first portion corresponding to a high-speed section of the target travel distance where the part is to be moved at a high speed and a second portion corresponding to a low-speed section of the same where the part is to be moved at a low speed and controls the frequency division means to frequency-divide the part of the pulse signal, generated from the pulse detecting means when the motor is driven to move the movable part, corresponding to the first portion of the target number of the pulses.

When the total travel distance of the movable part is not known in advance, the camera of the present invention may comprise an electric motor which drives a movable part of the camera, a pulse generating means which generates a pulse for every predetermined angle rotation of the motor, a pulse detecting means which detects the pulses generated by the pulse generating means, and a motor control means which feedback-controls the motor on the basis of a pulse signal consisting of a plurality of the pulses output from the pulse detecting means, wherein the motor control means is provided with a frequency division means which frequency-divides the pulse signal output from the pulse detecting means and input into the control means, a high speed period designating means which designates a high speed period in which the motor is to be driven at a high speed, and a frequency division control means which controls the frequency division means to frequency-divide the pulse signal generated from the pulse detecting means in the high speed period designated by the high speed period designating means.

The "pulse signal" need not be limited to those having sharp peaks but should be broadly interpreted to include various signals such as a sine wave signal or a square wave signal so long as the number of peaks included therein can be counted.

When the travel distance of the movable part is short, and it is not necessary to move the movable part at a high speed, the target number of pulses calculated by the target pulse number calculating means need not be divided and the motor control means may control the motor on the basis of the pulse signal as output from the pulse detecting means. In this case, the motor is driven at a low speed over the entire travel distance of the movable part. Whether it is necessary to move the movable part at a high speed can be determined, for instance, by comparing the target number of pulses calculated by the target pulse number calculating means (representing the target travel distance) with a predetermined value (representing a predetermined distance).

The ratio of the frequency of the pulse signal as output from the pulse detecting means to that of the frequency-divided pulse signal may be suitably selected according to the processing capacity of the motor control means, handling facility and the like.

The movable part to be driven by the motor may be, for instance, a movable lens of a zoom lens system, a lens which is moved for focusing or a system for feeding film.

The total travel distance of the movable part can be known in advance, for instance, in the case where the movable optical system for zooming is moved to a tele-side end position, a wide-side end position or one or more positions between these end positions, which are set in response to operation of a zoom switch. The case where the movable optical system for focusing is moved according to the distance to an object measured by a range finder and the case where film is taken up one frame by one frame or film is rewound are other examples.

The total travel distance of the movable part cannot be known in advance, for instance, when the movable lens of a zoom lens system is kept moved as long as a zoom switch is depressed.

In the camera of the present invention, the motor is driven at a high speed under feedback control based on a frequency-divided pulse signal in a predetermined section (up to a predetermined position) of a desired travel distance. Since the pulse intervals in the frequency-divided pulse signal are larger than those in the original pulse signal, the number of pulses input into the motor control means per unit time is reduced when the motor is feedback-controlled on the basis of the frequency-divided pulse signal. Therefore, load on the motor control means is reduced. Accordingly the motor can be driven at a higher speed.

When the movable part reaches the predetermined position, frequency division of the pulse signal output from the pulse detecting means is stopped and the motor is controlled on the basis of the pulse signal as output from the pulse detecting means, whereby the motor is decelerated and the movable part can be stopped in a desired position without overrun. Since when the motor is decelerated, the pulses are input into the motor control means at a lower frequency, load on the motor control means is not increased even if the motor is controlled on the basis of the pulse signal as output from the pulse detecting means, whereby the motor can be controlled more finely.

DESCRIPTION OF THE PREFERRED EMBODIMENT

Figure 1:
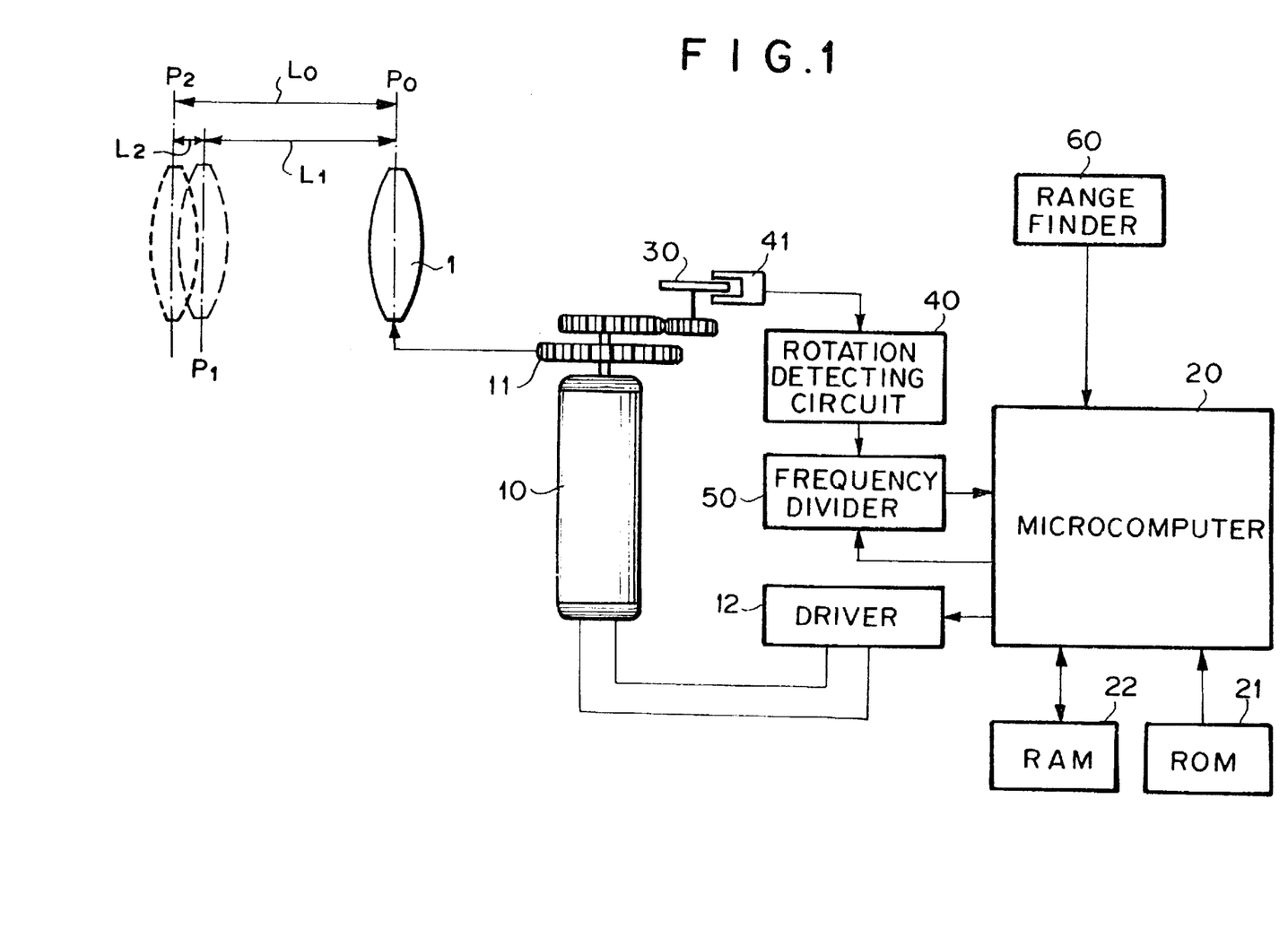
FIG. 1 is a block diagram showing an important part of a photographic camera in accordance with a first embodiment of the present invention.

In FIG. 1, a photographic camera in accordance with an embodiment of the present invention comprises a DC motor 10 driven by a motor driver 12 under the control of a microcomputer 20, a lens 1 which is moved back and forth in the direction of its optical axis by the motor 10 by way of a driving force transmission system 11 (e.g., a gear train) for focusing the camera, a rotary encoder 30 which is provided with a number of slits and is interlocked with the driving force transmission system 11 to rotate with the motor 10, a motor rotation detecting circuit 40 provided with a photo-detector 41 which detects light pulses (encoder pulses) passing through the slits of the encoder 30, a frequency divider 50 which frequency-divides a pulse signal (consisting of a plurality of pulses) output from the motor rotation detecting circuit 40 into 1/N (N≧1) as needed under the control of the microcomputer 20 and outputs a frequency-divided pulse signal, and a range finder 60 which measures the distance to an object. The microcomputer 20 determines a target travel distance $L_0$ through which the lens 1 is to be moved on the basis of the distance to the object measured by the range finer 60 and controls the motor driver 12 and the frequency divider 50 on the basis of the target travel distance $L_0$. The range finder 60 may be of any type. For example, the range finder 60 may be of a type which measures the distance to the object by projecting infrared rays.

The microcomputer 20 is provided with a ROM 21 in which a predetermined program is stored and a RAM 22 in which a plurality of predetermined values necessary for executing the program are stored. The program stored in the ROM 21 will be briefly described, hereinbelow.

The target travel distance $L_0$ is determined on the basis of the distance to the object measured by the range finder 60. Then the rotational angle of the motor 10 necessary to move the lens 1 by the target travel distance $L_0$ is calculated taking into account the reduction ratio of the driving force transmission system 11 and the like. A target number of the encoder pulses which the photodetector 41 is to detect when the motor 10 is rotated by the rotational angle is calculated and the target number of the encoder pulses is compared with a first predetermined value stored in the RAM 22. The first predetermined value is a value for determining whether the motor 10 is to be driven at a high speed. That is, when the target number of the encoder pulses is larger than the first predetermined value, i.e., when the target travel distance $L_0$ is larger than the distance corresponding to the first predetermined value, the pulse signal output from the motor rotation detecting circuit 40 is frequency-divided to 1/N ($1 \leq N$, N is stored in the RAM 22) and the motor 10 is driven at a high speed under feedback-control by the frequency-divided pulse signal until the number of the detected encoder pulses reaches a second predetermined value stored in the RAM 22. After the number of the detected encoder pulses reaches the second predetermined value, the frequency division is stopped (i.e., N is set to 1), and the motor 10 is driven at a low speed under feedback-control by the pulse signal output from the motor rotation detecting circuit 40 as it is until the number of the detected encoder pulses reaches the target number of the encoder pulses.

More particularly, when the camera is directed to an object, the range finder 60 measures the distance to the object and the measured distance L is input into the microcomputer 20. The microcomputer 20 calculates a target travel distance $L_0$ by which the lens 1 is to be moved to focus the taking lens system of the camera on the object. That is, the microcomputer 20 determines that the lens 1 in the position $P_0$ (FIG. 1) is to be moved by the distance $L_0$ to the position $P_2$. Then the rotational angle of the motor 10 necessary to move the lens 1 by the target travel distance $L_0$ is calculated and a target number of the encoder pulses ENC PULS to be output from the encoder 30 when the motor 10 is rotated by the rotational angle is calculated. (See the main routine shown in FIG. 2A) The target number of the encoder pulses ENC PULS is compared with the first predetermined value PLS stored in the RAM 22. (See the pulse allocation routine shown in FIG. 2C) The first predetermined value PLS is set to such a small value that the lens 1 need not be moved at a high speed or the motor 10 need not be driven at a high speed when the target number of the encoder pulses ENC PULS is smaller than the first predetermined value PLS.

When it is determined that the target number of the encoder pulses ENC PULS is not smaller than the first predetermined value PLS, or when the motor 10 is to be driven at a high speed, first and second counts CNT1 and CNT2 which are respectively given by the following formulae (1) and (2) are set. In the formulae (1) and (2), N represents a number which is not smaller than 2 and not larger than 255 when the microcomputer 20 has an 8-bit structure.

$$CNT1 = (ENC\ PULS - PLS)/N \quad (1)$$

$$CNT2 = ENC\ PULS - (CNT1 \times N) \quad (2)$$

For example, when the target number of the encoder pulses ENC PULS is 1000, the first predetermined value PLS is 30 and N is 4, the first count CNT1 is 242 and the second count CNT2 is 32.

On the other hand, when it is determined that the target number of the encoder pulses ENC PULS is smaller than the first predetermined value PLS, or when the motor 10 need not be driven at a high speed, values for the first count CNT1, N, and the second count CNT2 are set to values respectively given by the following formulae (3) to (5).

$$CNT1 = PLS \quad (3)$$

$$N = 1 \quad (4)$$

$$CNT2 = ENC\ PULS \quad (5)$$

Figure 2A:
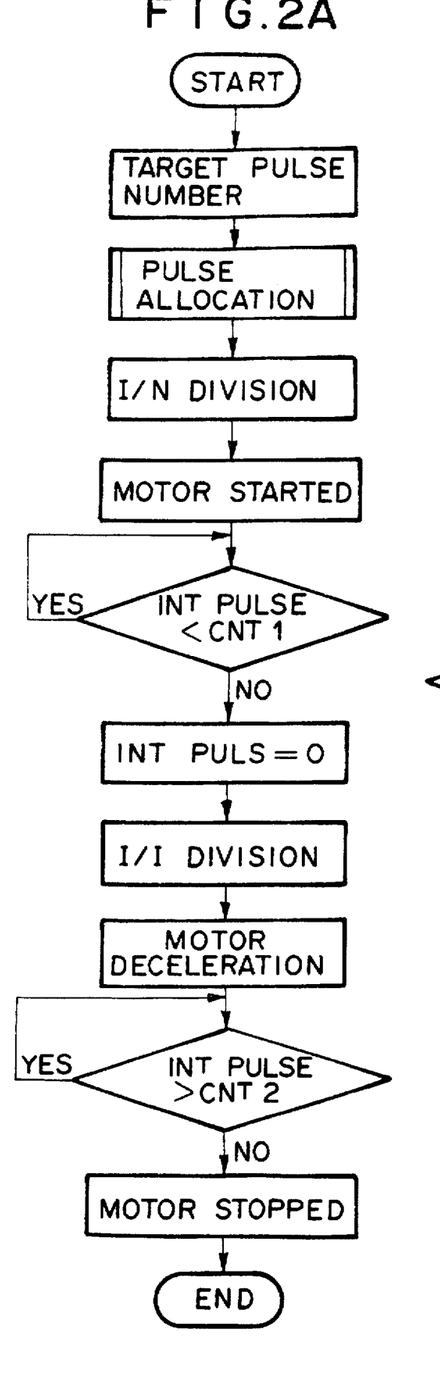
FIGS. 2A to 2C are flow charts for illustrating routines for controlling the motor, FIG. 2A being a main routine, FIG. 2B being an encoder interruption sub routine and FIG. 2C being a pulse allocation routine.

After the first count CNT1, N and the second count CNT2 are set in the manner described above, the microcomputer 20 returns to the main routine shown in FIG. 2A and sets the frequency divider 50 to divide the pulse signal input from the motor rotation detecting circuit 40 to 1/N ($N \geq 2$ when ENC PULS<PLS, N=1 when ENC PULS<PLS). Thereafter, the motor 10 is started.

Accordingly, when the target number of the encoder pulses ENC PULS is smaller than the first predetermined value PLS, the motor 10 is kept driven at a low speed from beginning to end under feedback-control by the pulse signal detected by the photodetector 41 as it is. When the target number of the pulses ENC PULS is not smaller than the first predetermined value PLS, the motor 10 is driven in the following manner.

When the motor 10 is started, the lens 1 is moved toward the position $P_2$ by way of the driving force transmission system 11 and light pulses passing through the slits of the encoder 30 are detected by the photodetector 41 as encoder pulses. The encoder pulses are converted into electric pulses and the motor rotation detecting circuit 40 outputs a pulse signal consisting of a plurality of the pulses to the frequency divider 50. The frequency divider 50 divides the pulse signal to 1/N ($N \geq 2$) and outputs the frequency-divided pulse signal to the microcomputer 20. The microcomputer 20 increments a counter by one every time one pulse (an encoder interruption pulse) is input into the microcomputer 20 (see the encoder interruption sub routine shown in FIG. 2B) and drives the motor 10 at a high speed under feedback-control on the basis of the frequency-divided pulse signal until the value of the counter or the number of the encoder interruption pulses INT PULS reaches the first count CNT1.

When the value of the counter or the number of the encoder interruption pulses INT PULS reaches the first count CNT1, the microcomputer 20 resets the value of the counter or the number of the 10 encoder interruption pulses INT PULS to 0. Then the microcomputer 20 sets N to 1 so that the pulse signal output from the motor rotation detecting circuit 40 is input into the microcomputer 20 without frequency division as the encoder interruption signal. That is, the encoder interruption pulses come to be input into the microcomputer 20 at a frequency N times the frequency before and the microcomputer 20 controls the motor 10 so that the encoder interruption pulses are input at the same frequency as before, whereby the motor 10 is decelerated to a low speed equal to 1/N of the high speed. The microcomputer 20 increments the counter by one every time one encoder interruption pulse is input into the microcomputer 20 (see the encoder interruption sub routine shown in FIG. 2B) and drives the motor 10 at the low speed until the value of the counter or the number of the encoder interruption pulses INT PULS reaches the second count CNT2.

When the value of the counter or the number of the encoder interruption pulses INT PULS reaches the second count CNT2, the motor 10 is stopped.

Figure 3:
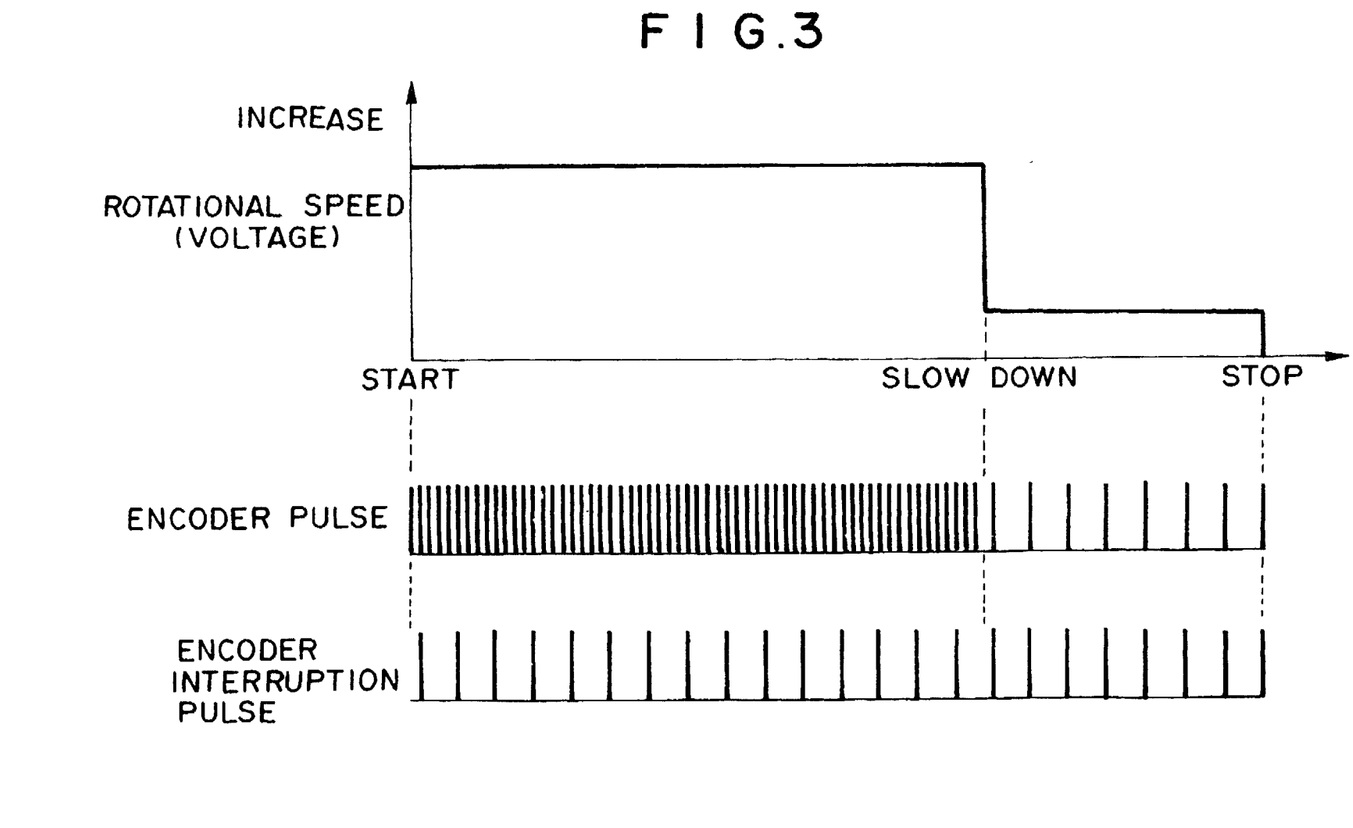
FIG. 3 is a graph showing the relation of the rotational speed of the motor (the electric voltage applied to the motor) to the encoder pulses input into the frequency divider and to the encoder interruption pulses input into the microcomputer.

FIG. 3 shows the relation of the rotational speed of the motor 10 (the electric voltage applied to the motor 10) to the encoder pulses input into the frequency divider 50 and to the encoder interruption pulses input into the microcomputer 20.

When the motor 10 is driven at a high speed, the encoder interruption pulses are input into the microcomputer 20 at a frequency of 1/N of the frequency at which the encoder pulses are generated by the encoder 30, whereby the load on the microcomputer 20 is reduced and the processing rate of the microcomputer 20 can be increased.

In the manner described above, the lens 1 in the position $P_0$ (FIG. 1) is moved to the position pi by the distance $L_1$ at a high speed and then to the position $P_2$ by the distance $L_2$ at a low speed. That is, the lens 1 is moved at a high speed in the major part of the target travel distance $L_0$ and then slowed down so that the lens 1 is stopped in the target position $P_2$ with a high accuracy.

Figure 2B:
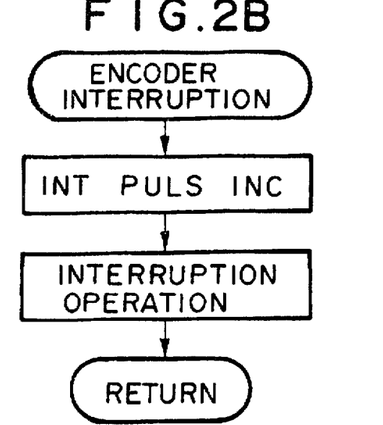
Figure 2C:
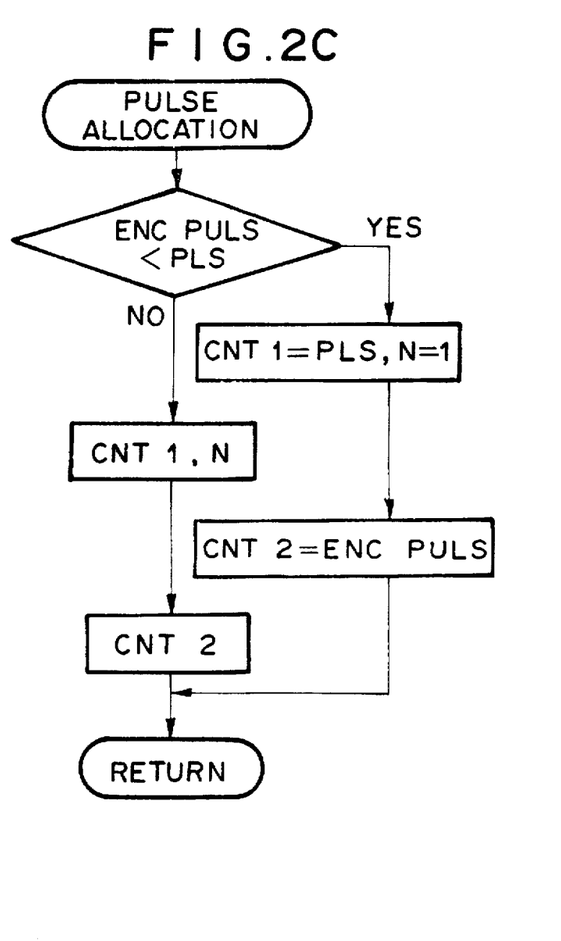
Figure 4:
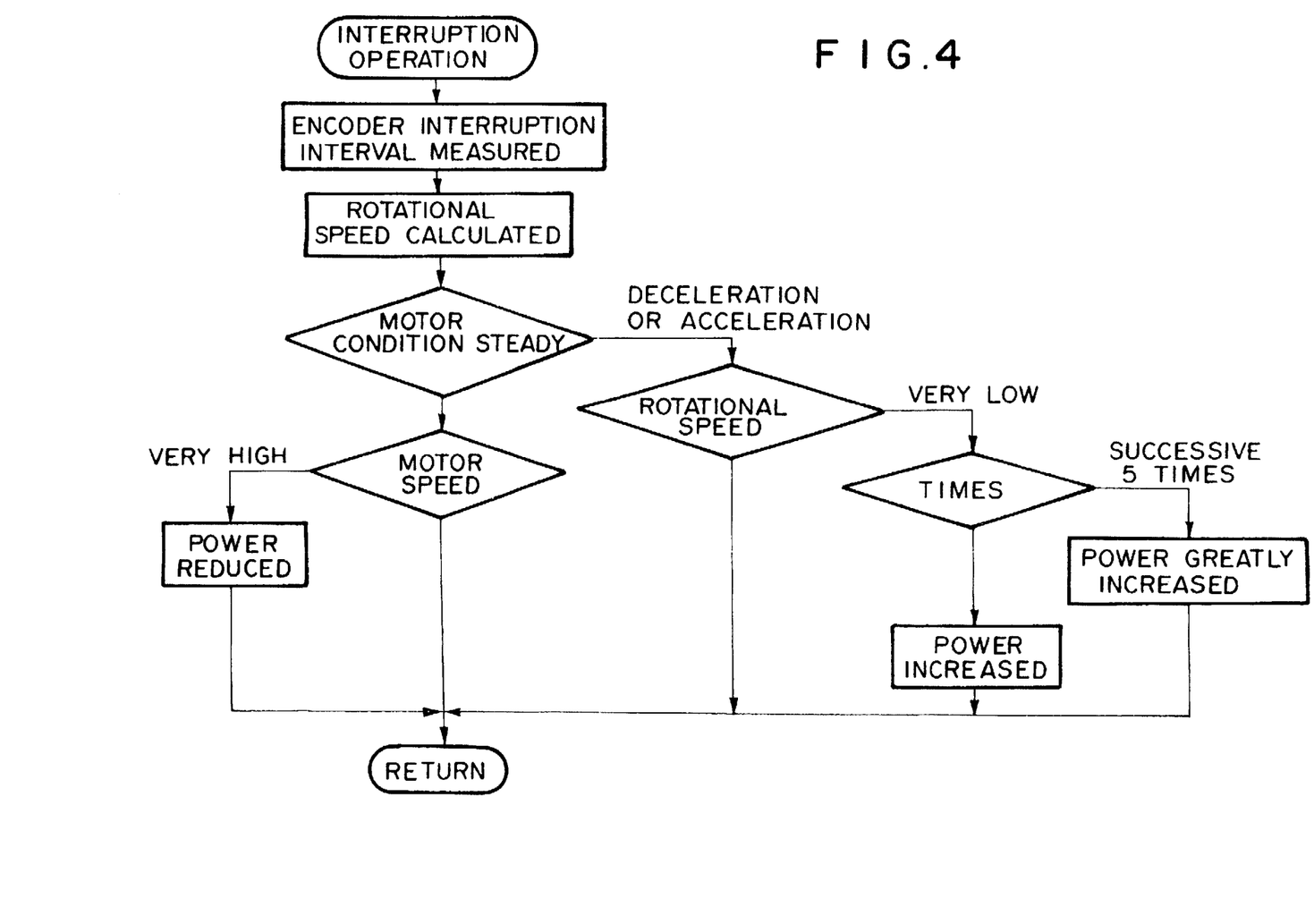
FIG. 4 is a flow chart for illustrating an example of a routine for controlling the rotational speed of the motor.

The interruption operation in the encoder interruption sub routine shown in FIG. 2B may be variously executed. FIG. 4 shows a flow chart for illustrating an example of a process for controlling the rotation of the motor 10. In the process shown in FIG. 4, the generation (input) intervals of the encoder interruption pulses are watched, and the rotational speed of the motor 10 is calculated on the basis of the generation intervals of the encoder interruption pulses, and the rotating condition of the motor 10 is detected on the basis of fluctuation in the rotational speed. When the rotating condition of the motor is steady, different processings are effected according to whether the rotational speed of the motor 10 is higher than a predetermined value. When it is determined that the rotational speed of the motor 10 is extremely high, power supplied to the motor (energy or current) is reduced to decelerate the motor 10. This process is for preventing the motor 10 from rotating at such a high speed that the microcomputer 20 overflows even if the encoder interruption signal is frequency-divided. However since normally the generation intervals of the encoder interruption pulses can be elongated by increasing the frequency division constant N, the process for decelerating the motor 10 may be omitted.

When it is determined that the motor 10 is accelerating or decelerating, different processings are effected according to whether the rotational speed of the motor 10 is lower than a predetermined value. That is, when the rotational speed of the motor 10 is lower than a predetermined value and is extremely low, the number of times the rotational speed of the motor 10 becomes extremely low is counted and when extremely low rotational speed of the motor 10 is detected successive five times, power supplied to the motor 10 is increased or greatly increased in order to prevent the motor 10 from stopping before the lens 1 reaches the desired position during deceleration of the motor 10.

Since the interruption operation is executed every time an encoder interruption pulse is input into the microcomputer 20, it occupies a large part of the processing time and is a cause of overflow of the microcomputer 20. However in the camera of this embodiment, since the number of the encoder interruption pulses input into the microcomputer 20 is not increased during the high speed driving of the motor, the number of times of the interruption operation can be small and accordingly the microcomputer 20 can well afford the interruption operation.

Figure 5:
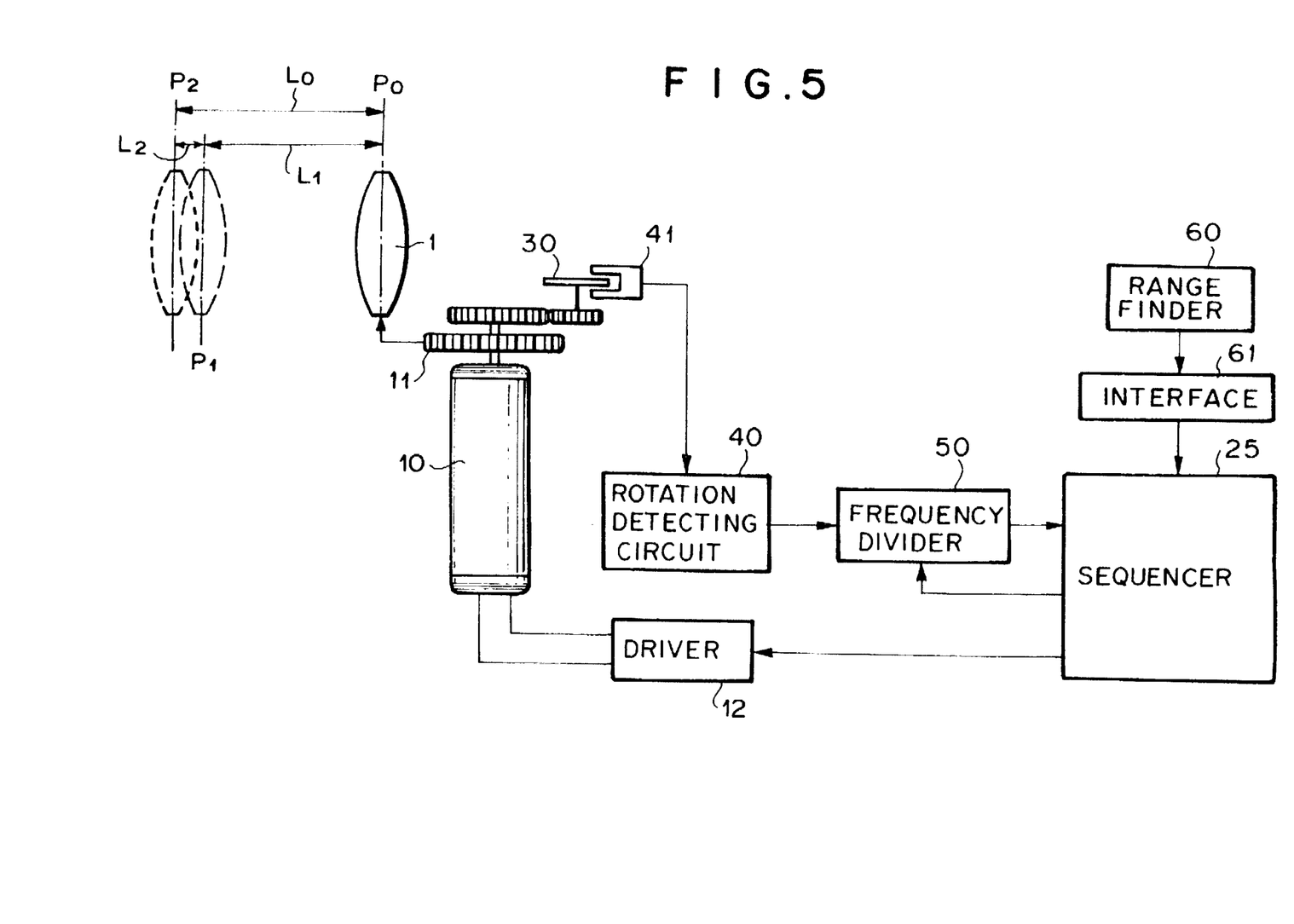
FIG. 5 is a block diagram showing an important part of a photographic camera in accordance with a modification of the first embodiment.

The camera of the present invention may be arranged by software using a microcomputer as in the embodiment described above and may be arranged by hardware such as a sequencer as shown in FIG. 5. When the camera is arranged by hardware as shown in FIG. 5, a larger number of counters and latches are required as the number of pulses to be handled increases. In the camera of the present invention, since the pulse signal is frequency-divided and the number of pulses is reduced when the motor is driven at a high speed, the number of counters and latches can be reduced, whereby the camera can be manufactured at low cost and the size of the camera can be reduced.

Though, in the embodiment described above, the present invention is applied to control of the motor for focusing the taking lens system in an autofocus camera, the present invention may also be applied to control of the motor for zooming a zoom lens system. In a camera where the magnification of the taking lens system is changed stepwise by zooming the lens system, the optical system for zooming is moved to a tele-side end position, a wide-side end position or one or more positions between these end positions, which are set in advance, in response to operation of a zoom switch. Accordingly the target travel distance of the optical system or the target rotational angle of the motor is known before the motor is driven. Accordingly, the motor for zooming can be controlled by a mechanism similar to that shown in FIG. 1. That is, in the mechanism shown in FIG. 1, a zoom position signal from the zoom switch is input into the microcomputer 20 instead of the signal from the range finder 60, which carries the distance to the object, and the motor is controlled on the basis of the zoom position signal.

A photographic camera in accordance with a second embodiment of the present invention will be described with reference to FIGS. 6 and 7, hereinbelow.

Figure 6:
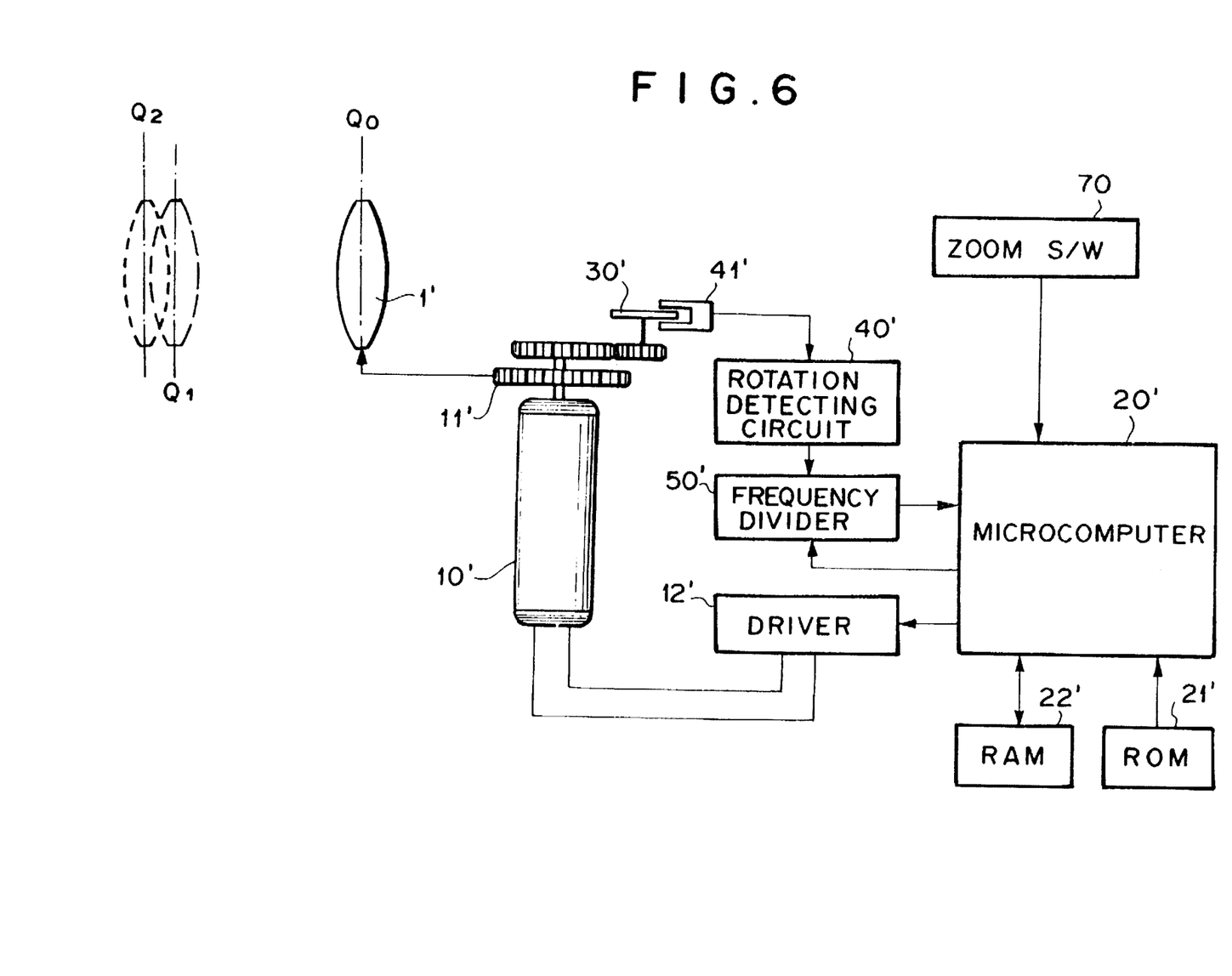
FIG. 6 is a block diagram showing an important part of a photographic camera in accordance with a second embodiment of the present invention.
Figure 7A:
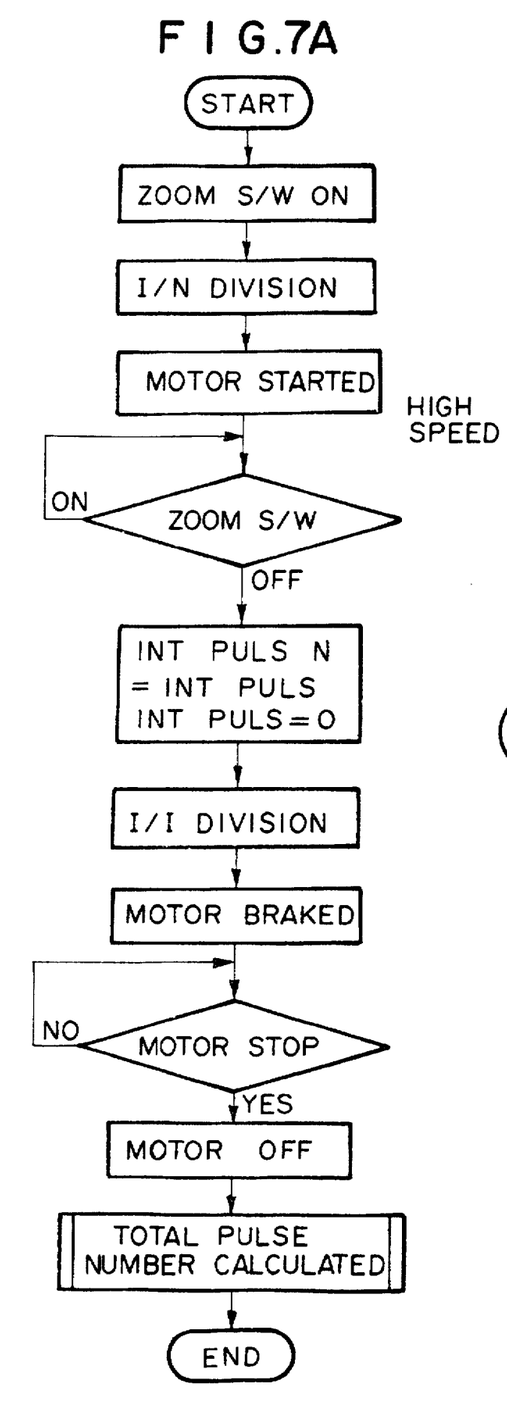
FIGS. 7A to 7C are flow charts for illustrating routines for controlling the motor in the second embodiment, FIG. 7A being a main routine, FIG. 2B being an encoder interruption sub routine and FIG. 2C being a pulse number calculation routine.

In the camera shown in FIG. 6, a lens 1' is kept in motion to zoom a zoom lens system (not shown, the lens 1' forms a part of the zoom lens system) as long as a zoom switch 70 is depressed. In this camera, the travel distance of the lens 1' is not known in advance since the lens 1' is kept moved until the zoom switch 70 is released.

In FIG. 6, the camera comprises a DC motor 10' driven by a motor driver 12' under the control of a microcomputer 20', a lens 1' which is moved back and forth in the direction of its optical axis by the motor 10' by way of a driving force transmission system 11' for zooming, a rotary encoder 30' which is provided with a number of slits and is interlocked with the driving force transmission system 11' to rotate with the motor 10', a motor rotation detecting circuit 40' provided with a photodetector 41' which detects light pulses (encoder pulses) passing through the slits of the encoder 30', a frequency divider 50' which frequency-divides a pulse signal (consisting of a plurality of pulses) output from the motor rotation detecting circuit 40' into 1/N (N≧1) as needed under the control of the microcomputer 20' and outputs a frequency-divided pulse signal and the zoom switch 70.

The microcomputer 20' is provided with a ROM 21' in which a predetermined program is stored and a RAM 22' in which a plurality of predetermined values necessary for executing the program are stored. The program stored in the ROM 21' will be briefly described, hereinbelow.

That is, when the zoom switch 70 is depressed, the pulse signal output from the motor rotation detecting circuit 40' is frequency-divided to 1/N (1<N, N is stored in the RAM 22') and the motor 10' is driven at a high speed under feedback-control by the frequency-divided pulse signal until the zoom switch 70 is released. When the zoom switch 70 is released, the frequency division is stopped (i.e., N is set to 1) and the pulse signal output from the motor rotation detecting circuit 40' is input into the microcomputer 20' as it is. Thereafter the motor 10' is braked and stopped. When the motor 10' stops, power to the motor 10' is cut.

More particularly, when the camera is directed to an object and the zoom switch 70 is depressed (with the lens 1' in position $Q_0$), a signal commanding a high speed movement of the lens 1' is input into the microcomputer 20'. The microcomputer 20' sets N to a value not smaller than 2 and then starts the motor 10'. When the motor 10' is started, the lens 1' is moved toward the position $Q_2$ by way of the driving force transmission system 11' and light pulses passing through the slits of the encoder 30' are detected by the photodetector 41' as encoder pulses. The encoder pulses are converted into electric pulses and the motor rotation detecting circuit 40' outputs a pulse signal consisting of a plurality of the pulses to the frequency divider 50'. The frequency divider 50' divides the pulse signal to 1/N (N≧2) and outputs the frequency-divided pulse signal to the microcomputer 20'. The microcomputer 20' increments a counter by one every time one pulse (an encoder interruption pulse) is input into the microcomputer 20'(see the encoder interruption sub routine shown in FIG. 7B) and drives the motor 10' at a high speed under feedback-control on the basis of the frequency-divided pulse signal until the zoom switch 70 is turned off.

When the motor 10' is driven at a high speed, the encoder interruption pulses are input into the microcomputer 20' at a frequency of 1/N of the frequency at which the encoder pulses are generated by the encoder 30', whereby the load on the microcomputer 20' is reduced and the processing rate of the microcomputer 20' can be increased.

When the zoom switch 70 is turned off (position $Q_1$), the microcomputer 20' stores the value of the counter or the number of the encoder interruption pulses INT PULS in the RAM 22' and then resets it to 0. Then the microcomputer 20' sets N to 1 so that the pulse signal output from the motor rotation detecting circuit 40' is input into the microcomputer 20' without frequency division as the encoder interruption signal. That is, the encoder interruption pulses come to be input into the microcomputer 20' at a frequency N times the frequency before and the microcomputer 20' controls the motor 10' so that the encoder interruption pulses are input at the same frequency as before, whereby the motor 10' is decelerated to a low speed equal to 1/N of the high speed.

Figure 7B:
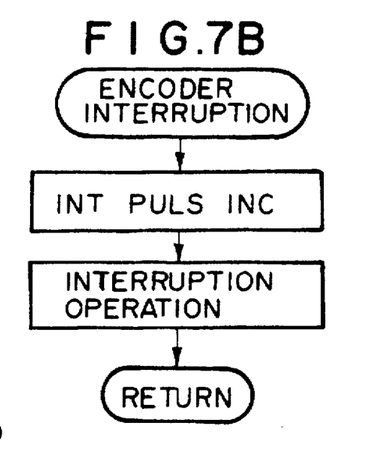
Figure 7C:
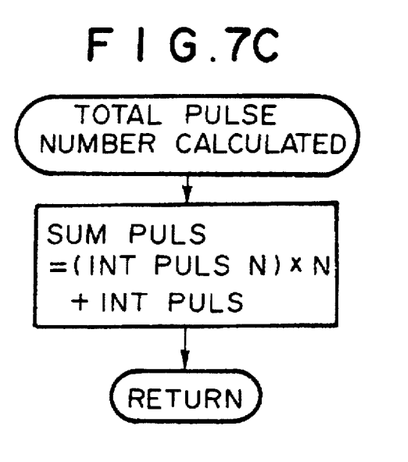

Then the motor 10' is braked and stopped (position $Q_2$) while the microcomputer 20' increments the counter by one every time one encoder interruption pulse is input into the microcomputer 20'(see the encoder interruption sub routine shown in FIG. 7B). When the motor 10' stops, power to the motor 10' is cut.

Then the microcomputer 20' calculates the total number of the detected encoder pulses SUM PULS corresponding to the travel distance of the lens 1' on the basis of the number of the encoder interruption pulses INT PULS H input into the microcomputer 20' during the high speed driving of the motor 10' which has been stored in the RAM 22' and the number of the encoder interruption pulses INT PULS L input into the microcomputer 20' during the low speed driving of the motor 10'. That is,

SUM PULS=(INT PULS H)×N+(INT PULS L)

Then the microcomputer 20' terminates the processing after storing the total number of the detected encoder pulses SUM PULS in the RAM 22'.

In the case of a zoom lens system where the movable part is not mechanically moved by use of a helicoid but is electrically moved by use of a cam, that is, in the case of a zoom lens system where focus is not corrected in response to zooming action, the lens system gets out of focus during zooming. Accordingly such a zoom lens system must be focused after zooming. For example, in the case of a zoom lens system where the focal length is changed by changing the separation between the front lens group and the rear lens group and focusing is effected by changing the position of the rear lens group, focusing cannot be automatically effected unless the position of the front lens group is known with accuracy. For this reason, the microcomputer 20' stores the total number of the detected encoder pulses SUM PULS which represents the position of the lens 1'.

Thus in the camera of the second embodiment, the motor 10' is kept driven at a high speed throughout the period when the user intends to zoom and is driven at a low speed in the period of overshooting. Accordingly, the angular position of the motor 10' can be known with a high accuracy.

The present invention can also be applied to control of a motor for a film feeding system, i.e., for driving a film take-up spool. In this case, since the film is taken up one frame by one frame and the length to be taken up each time is known, the motor may be controlled on the basis of the length to be taken up each time.

However since the length which is taken up per unit rotational angle of the take-up spool increases as the outer diameter of the film roll wound around the take-up spool increases, the space between the frames is gradually increased when the angle by which the motor is rotated for each film take-up action is fixed.

Accordingly it is preferred that the length actually taken up be watched, for instance, by counting a number of perforations passing through a predetermined position by use of a photosensor or the like, or by detecting a rotational angle of a gear in mesh with the perforations, and the motor be stopped when the film is fed in a predetermined length.

Figure 8:
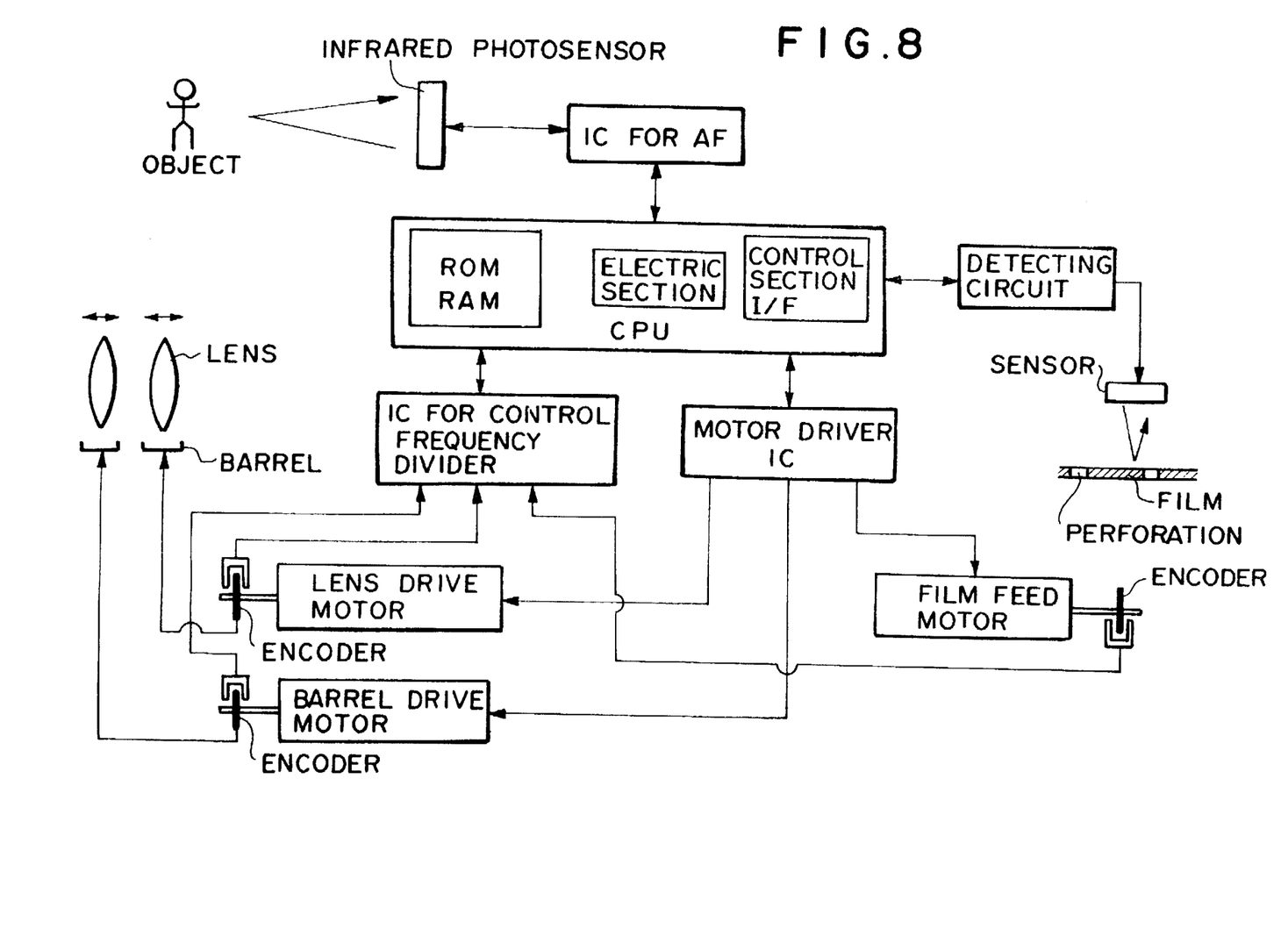
FIG. 8 is a block diagram showing an important part of a photographic camera in accordance with a third embodiment of the present invention.

The control system of the present invention may be applied to all the motors for focusing, zooming and film feeding. FIG. 8 schematically shows a camera in which the focusing motors, the zooming motors and the film feeding motors are controlled by the control system of the present invention. In FIG. 8, some of the elements, e.g., the zoom switch, shutter release switch and the like, are omitted.

What is claimed is:

1. A photographic camera comprising:

an electric motor for driving a movable part of said photographic camera;

a pulse signal generating means, responsive to a rotation of said motor, for producing a pulse signal corresponding to the rotation of said motor; and a frequency divider for selectively dividing the pulse signal produced by said pulse signal generating means and outputting a result to a controller which supplies a result to a driver of said motor to feedback control said motor;

wherein said pulse signal is charaterized according to pulse number by the frequency divider into a high-speed portion signal corresponding to a period where the motor is driven at a high speed and a low-speed portion signal corresponding to a period where the motor is driven at a low speed, and wherein the frequency divider frequency divides said high-speed portion signal and the motor is driven at a high speed under feedback control based on the frequency-divided high-speed portion signal.

2. A photographic camera comprising:

an electric motor which drives a movable part of the camera;

a pulse generating means which generates a first set of pulses for a predetermined angle rotation of the motor;

a pulse detecting means which detects the first set of pulses generated by the pulse generating means and produces a second pulse signal;

a target travel distance calculating means which calculates a target travel distance through which the movable part is to be moved;

a target pulse number calculating means which calculates a target number of pulses which the pulse detecting means should detect when the motor rotates to move the movable part through the target travel distance; and a motor control means which feedback-controls the motor on the basis of the target number of pulses and the second pulse signal output from the pulse detecting means, wherein the motor control means further comprises:

a frequency division means which frequency-divides the second pulse signal; and     a frequency division control means which divides the target number of pulses into a first portion, corresponding to a high-speed section of the target travel distance wherein the part is moved at a high speed, and a second portion, corresponding to a low-speed section of the target travel distance wherein the part is moved at a low speed, and which controls the frequency division means to frequency-divide the second pulse signal when the motor is driven to move the movable part during the first portion of the target number of the pulses.

3. A photographic camera comprising:

an electric motor which drives a movable part of the camera;

a pulse generating means which generates a first set of pulses for a predetermined angle rotation of the motor;

a pulse detecting means which detects the first set of pulses generated by the pulse generating means and produces a second pulse signal; and a motor control means which feedback-controls the motor on the basis of the second pulse signal output from the pulse detecting means, wherein the motor control means further comprises:

a frequency division means which frequency-divides the second pulse signal;

means for designating a high speed period in which the motor is to be driven at a high speed and for designating a lower speed period in which the motor is to be driven at a low speed; and     a frequency division control means which controls the frequency division means to frequency-divide the second pulse signal in the high speed period designated by the means for designating high and low speed periods.

* * * * *